United States Patent [19]

Karafian et al.

[11] Patent Number: 5,006,131
[45] Date of Patent: Apr. 9, 1991

[54] APPARATUS FOR PRODUCTION OF SYNTHESIS GAS USING CONVECTIVE REFORMING

[75] Inventors: Maxim Karafian, Cold Spring Harbour; Irving C. Tsang, Flushing, both of N.Y.

[73] Assignee: Stone & Webster Engineering Corporation, Boston, Mass.

[21] Appl. No.: 253,542

[22] Filed: Oct. 3, 1988

Related U.S. Application Data

[62] Division of Ser. No. 944,327, Dec. 19, 1986, Pat. No. 4,824,658, which is a division of Ser. No. 749,869, Jun. 27, 1985, abandoned.

[51] Int. Cl.$^5$ .............................................. B01J 7/00
[52] U.S. Cl. ................................. 422/201; 48/94; 48/95; 422/190; 422/201; 422/204.20
[58] Field of Search ............... 422/190, 196, 197, 198, 422/203, 204, 189, 201, 211; 48/196 A, 214 A, 94, 95; 423/651, 652; 252/373

[56] References Cited

U.S. PATENT DOCUMENTS

| | | |
|---|---|---|
| 1,692,476 | 11/1928 | Wadsworth . |
| 1,742,888 | 1/1930 | Wolf . |
| 1,904,592 | 4/1933 | Young et al. ............... 423/652 |
| 2,123,799 | 7/1938 | Podbielniak . |
| 2,625,470 | 8/1946 | Roberts, Jr. ............... 48/196 A |
| 2,809,922 | 10/1957 | Berg . |
| 3,081,268 | 3/1963 | Marshall, Jr. . |
| 3,094,391 | 6/1963 | Mader ............... 23/212 |
| 3,147,084 | 9/1964 | Franzen et al. ............... 23/288 |
| 3,264,066 | 8/1966 | Quartulli et al. ............... 423/654 |
| 3,278,452 | 10/1966 | Vorum ............... 252/376 |
| 3,367,882 | 2/1968 | Marshall, Jr. . |
| 3,532,472 | 2/1967 | Foster ............... 23/288 |
| 3,661,767 | 5/1972 | Wirth . |
| 3,705,009 | 12/1972 | Dougherty . |
| 3,787,188 | 1/1974 | Lyon ............... 23/288 |
| 4,127,389 | 11/1978 | Hackemesser et al. ............... 422/201 |
| 4,162,290 | 7/1979 | Crawford et al. ............... 422/190 |
| 4,256,783 | 3/1981 | Takada et al. ............... 422/197 |
| 4,321,130 | 3/1982 | Bacsik . |
| 4,352,341 | 10/1982 | Styslinger ............... 122/7 R |
| 4,471,821 | 9/1984 | Coulon et al. ............... 141/286 |
| 4,505,879 | 3/1985 | Lhonoré et al. ............... 422/197 |
| 4,552,741 | 11/1985 | Melchior ............... 422/190 |
| 4,650,651 | 3/1987 | Fuderer ............... 422/194 |
| 4,666,680 | 5/1987 | Lewis ............... 422/197 |
| 4,702,891 | 10/1987 | Li et al. ............... 422/140 |

FOREIGN PATENT DOCUMENTS

50-20959 7/1975 Japan .

*Primary Examiner*—Peter Kratz
*Attorney, Agent, or Firm*—Hedman, Gibson, Costigan & Hoare

[57] ABSTRACT

A convective reformer device is provided which is useful for partially reforming a feed mixture of hydrocarbons and steam. The device includes an outer shell enclosure and a tubular inner core assembly and is specifically adapted to support heat exchange between a heating fluid, which may be an effluent from downstream, and the hydrocarbon-steam feed mixture. The convective reformer is used in a system and process for the steam reformation of hydrocarbons, in which the partially reformed effluent from the convective reformer is further reformed in a steam reforming furnace, or an auto-thermal reformer, or a steam reforming furnace followed by an auto-thermal reformer. The fully reformed effluent from the steam reformer, or auto-thermal reformer, is directed back to the convective reformer to supply the heat of reaction for the partial reformation of the feed mixture. This heating fluid may be directed through the tube portion of the convective reformer, or alternatively, through the shell portion, either of which may be filled with catalyst. The gas that emerges from the convective reformer, which has undergone heat exchange with the feed mixture may be used to preheat the feed mixture to the convective reformer.

1 Claim, 5 Drawing Sheets

APPARATUS FOR PRODUCTION OF SYNTHESIS GAS USING CONVECTIVE REFORMING

This is a divisional, of application Ser. No. 06/944,327 filed Dec. 19, 1986 now U.S. Pat. No. 4,824,658 which is in turn a divisional of application Ser. No. 749,869, filed on June 27, 1985 now abandoned.

BACKGROUND OF THE INVENTION

1. Field of the Invention

This invention is directed to an improved process and system for the production of hydrogen-rich gas by the steam reforming of hydrocarbons by indirect heat exchange. The device used herein is similar to a shell and tube heat exchanger but the tubes or the shell are filled with reforming catalyst. In this invention, the device is called a "convective reformer". Additionally, this invention addresses the use of the "convective reformer" in unique low energy processing configurations for the manufacture of hydrogen-rich synthesis gas for the production of ammonia, methanol, hydrogen, oxo synthesis gas, reducing gas for the reduction of iron ore, and other processes, in a most thermally efficient manner.

2. Description of the Prior Art

A number of processes have been described in which hot effluent streams emanating from the process are used to provide convection heating to a portion of the process.

Wadsworth, U.S. Pat. No. 1,692,476 discloses a method and apparatus for cracking and rectifying petroleum oils in which hot effluent is used to preheat the charge.

Wolf, U.S. Pat. No. 1,742,888 discloses a process for converting hydrocarbons and mineral oils in which the hot effluent from a heating furnace is used to preheat entering oil.

Podbielniak, U.S. Pat. No. 2,123,799 discloses a process for the of heat treatment of hydrocarbon gases in which effluent from a conversion furnace preheats an incoming gas charge.

Berg et al., U.S. Pat. No. 2,809,922 discloses a catalytic conversion process and apparatus having improved temperature control of the reaction and which makes extensive use of heat interchange between different portions of the apparatus.

Vorum, U.S. Pat. No. 3,278,452 discloses a method of producing hydrogen-containing gases in which steam for reforming and natural gas for reacting are formed and heated in the convective portion of a primary reformer before being passed to a secondary reformer.

Marshall, Jr., U.S. Pat. No. 3,367,882 discloses an ammonia synthesis gas process in which the hydrogen gas feed in preheated by convection means from reformer heat before passing into the primary reformer. Waste heat boilers make use of the hot effluents in the system to generate process steam.

Wirth et al., U.S. Pat. No. 3,661,767 discloses a fluid coking-steam cracking combination process wherein heavy and light fractions pass from respective sections of the coker vessel through the convection section of the steam cracker, before being returned to the coker or removed as product.

Dougherty, U.S. Pat. No. 3,705,009 discloses heat recycling for ammonia preparation in which process natural gas passes through a convective preheater portion of a primary reformer apparatus. This portion is also used to heat process air for the secondary reformer. Waste heat boilers are used to recover heat from the reformer effluents.

Bacsik, U.S. Pat. No. 4,321,130 discloses the preheating of feed gas in the convection portion of a pyrolysis furnace tubular reactor before passing to a primary fractionator, and the use of fractionator effluent to preheat combustion air by employing a bottom pump around, top pump around and/or quench water streams.

Crawford et al., U.S. Pat. No. 4,162,290 discloses a process for reforming hydrocarbons into hydrogen and ammonia, in which a convective reformer is used in parallel with a primary reformer and sensible heat from a secondary reformer effluent is used as the heat source for the convective reforming section.

SUMMARY OF THE INVENTION

It is an object of this invention to provide a device that is useful to steam reform hydrocarbons to produce a hydrogen-rich gas by indirect heat exchange with hot waste streams.

It is another object of this invention to provide a number of processing configurations whereby the thermodynamic efficiency of conventional reforming processes is improved by using high temperature waste heat most advantageously through the means of the above mentioned "convective reformer" device.

It is a further object of this invention to provide a means for reducing the size and fuel consumption of the primary reforming furnace in a steam reforming process.

These and additional objects which will be apparatus from the description that follows are accomplished by the practice of the invention summarized below.

In brief, this invention in one of its aspects comprises an improvement in a reforming process for the manufacture of synthesis gas for the production of hydrogen, ammonia, methanol, oxo synthesis and iron ore reduction gases. The invention also comprises in another aspect an apparatus (device) for the catalyzed steam reformation of a hydrocarbon feed gas mixture prior to its further conversion in a conventional reforming furnace or auto-thermal reformer. In this device, the endothermic heat of reaction for the steam reformation reaction is supplied by heat exchange with a hot reformed gas coming from an outside reforming furnace or auto-thermal reformer, or even from a secondary reformer in cases where primary and secondary reformers are used such as in the production of ammonia.

The system design and process of the present invention provide advantages over the arrangement shown in U.S. Pat. No. 4,162,290. In the patent, exchanger-reactor 28 is shown in parallel with reforming furnace 13 in FIG. 1. The same is true of exchanger-reactor 74 and reforming 53 in FIG. 2. In the present invention, the convective reformer which provides a means of heat exchange is in series, not parallel, with the reforming furnace. This in-series arrangement enables the use of operating conditions which are easier on the equipment and less likely to lead to failure. For instance, with the present in-series system design, only 15 to 25% of the methane in the feed material is reformed in the convective reformer. This lower degree of conversion is readily achieved at relatively low operating temperatures of 1150° to 1250° F. generally. In contrast, the process of the patent, which typically involves reformation of 45% or more of the methane in the feed mixture, employs higher temperatures, for instance, as high as 1492° F. At these more severe conditions, specifically, higher tube wall temperatures, the service life of the exchanger-reactor type device will be reduced.

DETAILED DESCRIPTION OF THE INVENTION AND DRAWINGS

Figures 1, 1A:
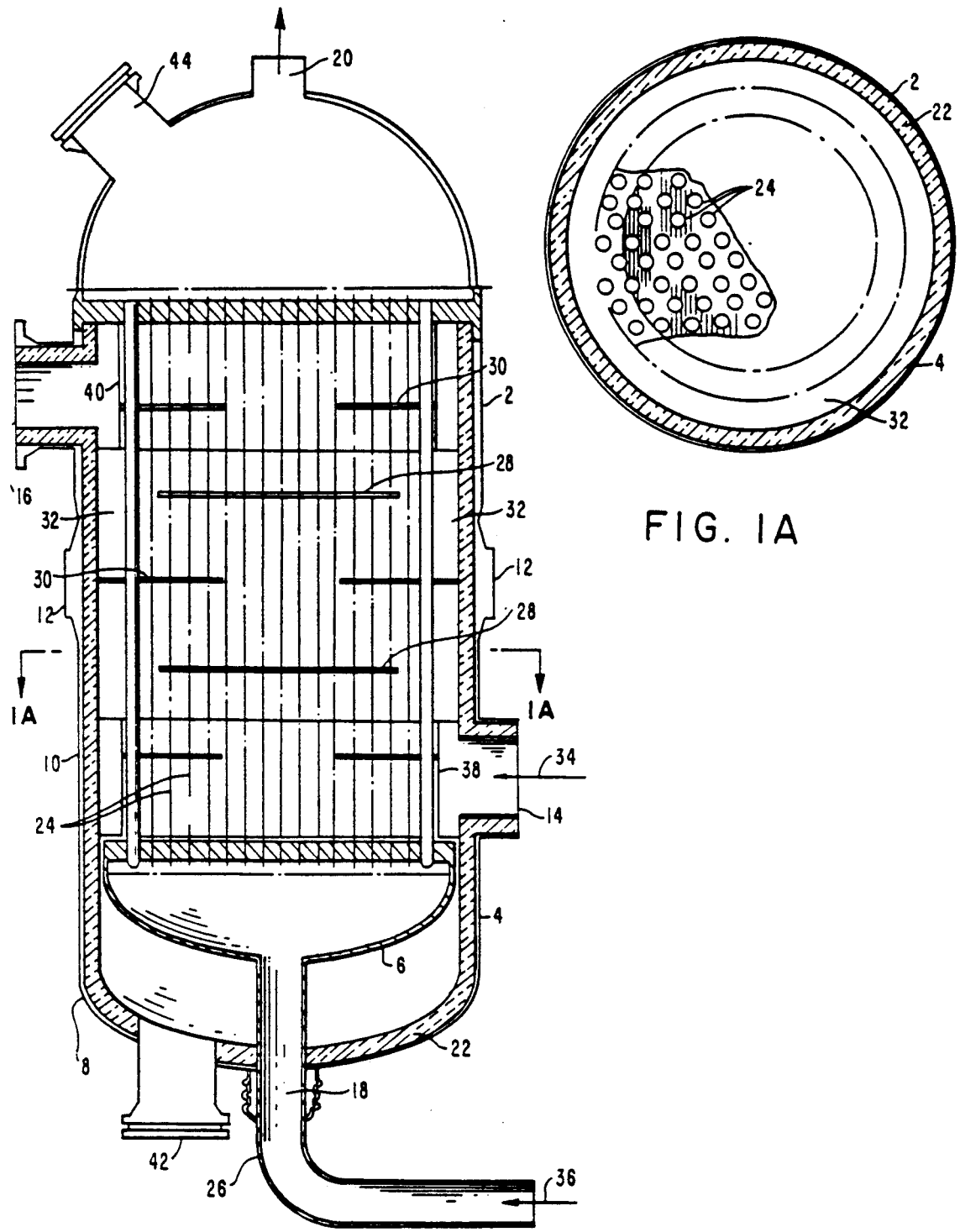
FIGS. 1 and 1A illustrate, in cross-section, a preferred convection reformer device in accordance with this invention.

The convective reforming device of this invention in its broadest aspects comprises (1) an outer shell enclosure comprising (i) two end portions, (ii) a cylindrical main body portion, and (iii) separate inlet and outlet means for the conveyance of a heating fluid, each of which includes perforated distributor plate means for delivering the heating fluid substantially uniformly to and from (2) a core assembly within the outer shell enclosure, which comprises (i) separate inlet and outlet conduit means at opposite ends for the flow-through of the feed mixture of hydrocarbons and steam, the inlet and outlet conduit means extending through outer shell enclosure (1) to the outside of the convective reformer device, and (ii) a multiplicity of tubular conduits which are open to the path of feed mixture flow, the conduits being adapted to contain a particulate solid catalyst for contacting with the feed mixture; wherein outer enclosure (1) and the core assembly (2) are separated by a passageway for the heating fluid which is in open communication with the heating fluid inlet and outlet means of outer shell enclosure (1), the passageway surrounding tubular conduits (ii) of core assembly (2).

The process for convective reformation of this invention in its broadest description comprises the following sequential series of steps, which are conducted on a continuous basis:

(a) delivering a feed mixture of hydrocarbons and steam to a first reformation zone which comprises convective reformation means;

(b) partially reforming the feed mixture in the first reformation zone;

(c) delivering the partially reformed effluent from the first reformation zone to one or more additional reformation zones;

(d) further reforming the partially reformed effluent in the additional zone or zones into a hydrogen-rich gas;

(e) directing at least a portion of the hydrogen-rich gas back to the first reformation zone;

(f) effecting heat-exchange between the hydrogen-rich gas and the feed mixture in the first reformation zone such that the heat of reaction for the partial reformation reaction in this zone is thus supplied, and (g) passing at least a portion of the heat-exchanged hydrogen-rich gas from step (f) to one or more additional heat-exchange zones, located upstream of the first reformation zone of (a), for use as a heating fluid therein.

In step (g), the hydrogen-rich gas may be used to help generate fresh amounts of high pressure process steam for the process, or to preheat the feed mixture to step (a), or both.

Typically, in conventional steam reforming processes, hydrocarbons and steam are contacted over a steam reforming catalyst under conditions that are conducive to the formation of a hydrogen-rich gas. In such processes, gaseous hydrocarbons, such as natural gas, and vaporizable liquid hydrocarbons, such as liquidified petroleum gas and naphtha, are used as the feed material. The most common steam reforming catalyst in commercial procedures is nickel. In general, the nickel catalyst is manufactured as nickel oxide on an inert support and, in turn, reduced to nickel in situ with hydrogen.

The steam reforming reaction is generally carried out using steam to carbon ratios from 3:1 to 4.5:1, on weight basis. Conventionally, a feed comprising the hydrocarbon and steam mixture is heated to a temperature at which the reforming reaction begins to occur. The feed is then further heated in catalyst-filled tubes in the radiant section of a reforming furnace. The degree of conversion of methane in the feed to hydrogen is a function of the operating temperature and pressure in the furnace, with the conversion reaction being favored by the use of high temperatures and low pressures. The specific temperatures at which the hydrocarbon feed is heated are dependent upon tube size and metallurgy. For instance, at elevated temperatures of about 870° C., pressures of about 24 atmospheres are used for those tube sizes normally employed in commercially available reforming furnaces. For lower operating temperatures of about 800° C., on the other hand, a pressure of about 32 atmospheres in used for such devices.

Turning now to the drawings, in FIG. 1 it can be seen that the convective reformer device according to this invention is capable of functioning as a heat exchanger which contains catalyst-filled tubes.

Referring to FIG. 1, which illustrates a preferred embodiment, convective reformer device 2, in accordance with this invention, comprises outer shell 4, which can be made of carbon steel, and inner core assembly 6, which is of stainless steel. Outer shell 4 includes elliptical head portion 8, main body portion 10, flanged enclosures 12, inlet distribution annulus 14, outlet collection annulus 16, inlet port 18 and outlet port 20. Outer shell 4 is lined with a layer of heat insulation material 22, which is preferably made of blanket type insulation having a thickness of 4 inches.

Inner core assembly 6 comprises multiple steel tubes 24, which are parallel to one another and to the fluid flow through conduit 26. In the preferred cases, from about 250 to about 1000 tubes are employed. Core assembly 6 also contains disc-type baffles 28 and donut-type baffles 30, which are equally spaced from one another. Core assembly 6 is separated from outer shell 4 and insulation layer 22 by cavity 32, which surrounds most of the core assembly, as also shown in FIG. 1A.

Referring again to FIG. 1, convective reformer 2 also comprises inlet distribution annulus 14 and outlet collection annulus 16, containing perforated distributor plates 38 and 40, respectively. Distributor plates 38 and 40 serve to insure that the heating fluid flows into core assembly 6 and around the tubes evenly, and that it emerges the tube area uniformly to collect in duct 16. Baffle sets 28 and 30 function to increase the velocity of fluid which enters through 14 and passes around and in contact with the tubes, thereby increasing the degree or rate of heat transfer. Tubes 24 are sufficiently constricted in orifice size at their lower ends so as to retain the catalyst while insuring the uniform flow of feed gas stream 36 to each of the tubes. Manways 42 and 44 permit access to the inside of the convective reformer. Top manway 44 is useful for the filling and emptying of catalyst in tubes 24. Flanged enclosures 12 are included to facilitate the hydrostatic testing of the shell enclosure.

In practice, hot effluent stream 34, from downstream in the process, enters convective reformer device 2, through inlet distribution annulus 14 and perforated plate 38, travels through cavity 32, and thus around and in cointact with core assembly 6, and leaves through outlet collection annulus 16 and perforated plate 40. Simultaneously, process feed stream 36, which is being treated in accordance with the invention, enters inner core assembly 6 through conduit 26 and inlet port 18, and travels through tubes 24, whereby it is heated in the presence of the catalyst and thus partially reformed. Preferably, from about 15 to about 25% of any methane present in the feed mixture is reformed in this step. The heat of reaction is supplied by exchange through the tube walls with hot effluent stream 34 on its path through cavity 32. Thus, stream 34 serves as a heating fluid. The partially reformed gas stream then leaves core assembly 6 through outlet port 20.

Further details of preferred features for FIG. 1 of the invention practiced as described above are as follows:

Baffles: Five (5) disc-type, four (4) donut-type, equally spaced;

Tubes: Three hundred and twenty-six (326) in number, 3 inch outer diameter by 14 B.W.G. seamless stainless steel, minimum wall thickness of 0.095 inch, on a 3¾ inch pitch strength welded into tube sheets;

Perforated Distributor Plates:
(a) Inlet Distribution
Annulus: Fifteen hundred (1500) ½-inch diameter equally spaced holes all around, arranged in six (6) rows;
(b) Outlet Collection
Annulus: Twelve hundred and fifty (1250) ½-inch diameter equally spaced holes all around, arranged in five (5) rows.

It should be noted that the particular number of tubes and the shell size of the convective reformer device is subject to variation to increase or decrease their capacity, depending on production requirements.

Figure 2:
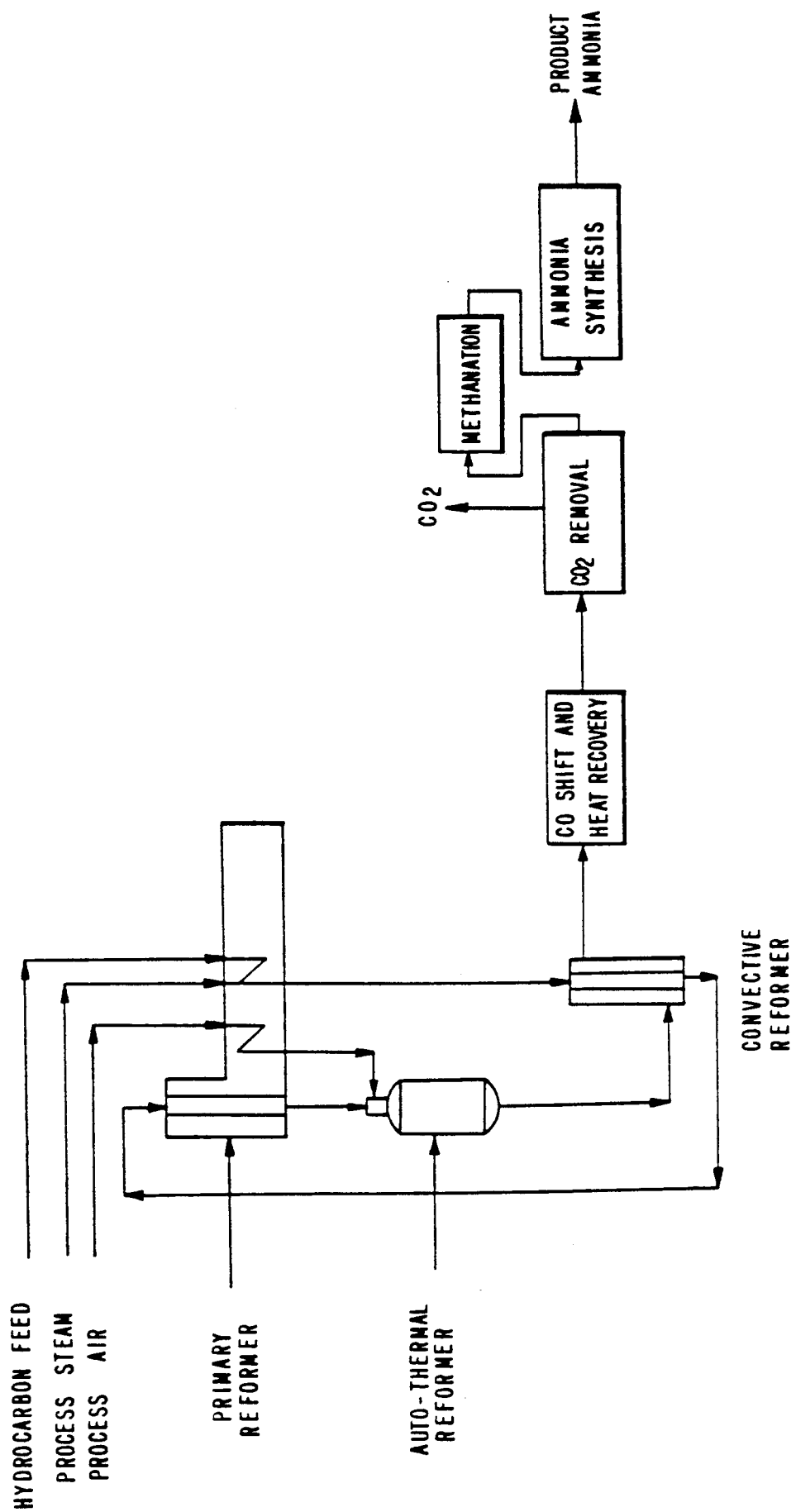
FIG. 2 is a schematic diagram showing how the convective reformer device of FIG. 1 may be used in a process for production of ammonia which also employs primary and auto-thermal reformers.
Figure 3:
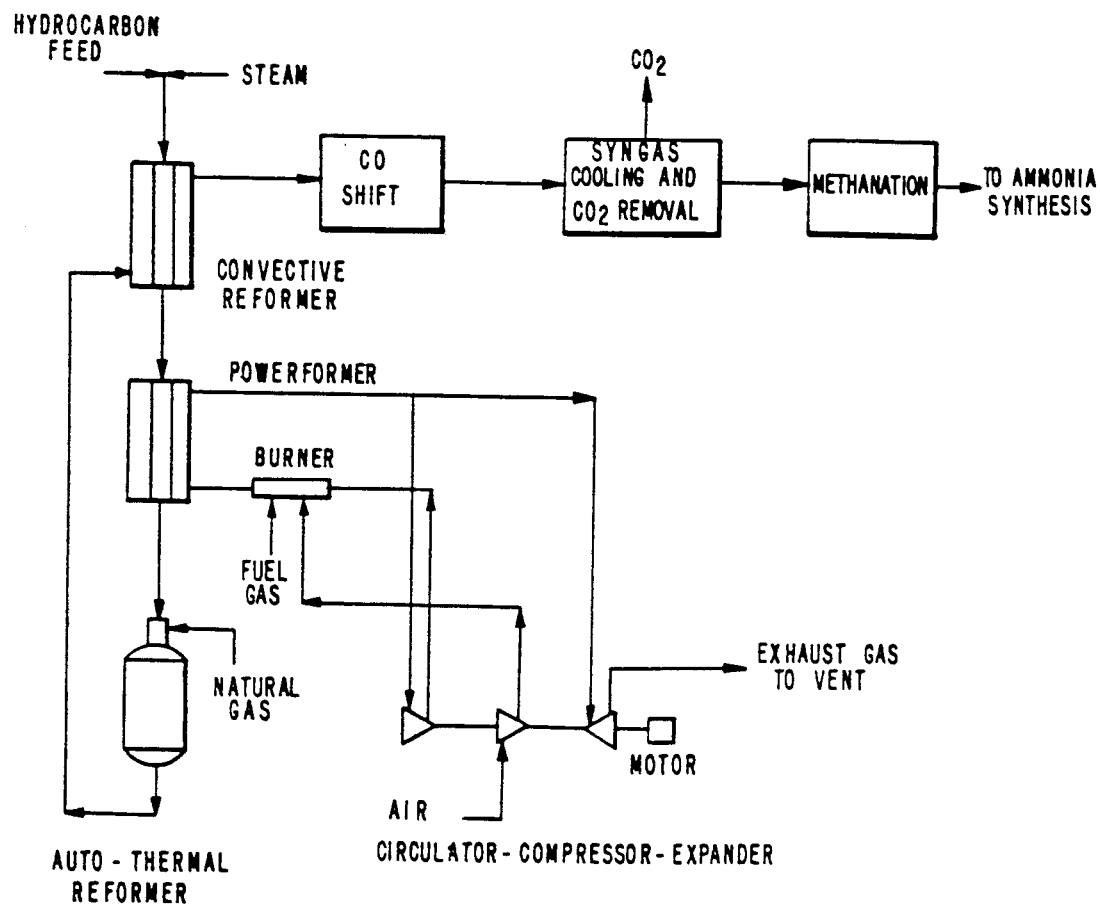
FIG. 3 is a schematic diagram which shows how the convection reformer device may be used in another process for the production of ammonia, this one employing a powerformer device (such as the powerformer described in U.S. Pat. No. 3,958,951, incorporated herein by reference).
Figure 4:
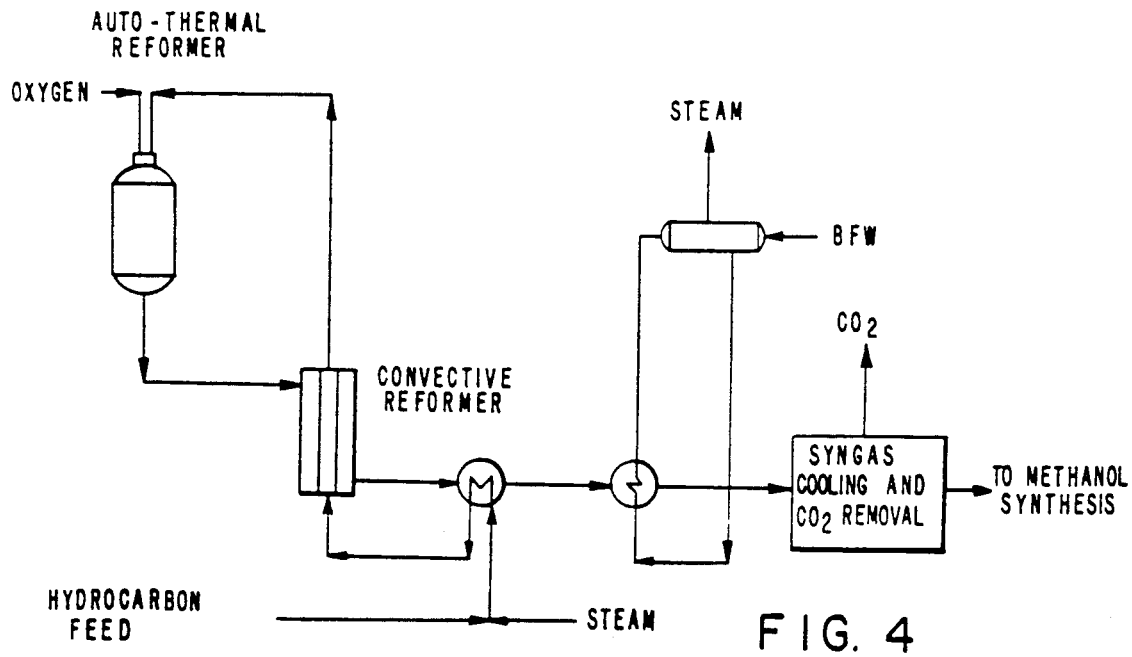
FIG. 4 is a schematic diagram of a process for methanol production using the convective reformer device.
Figure 5:
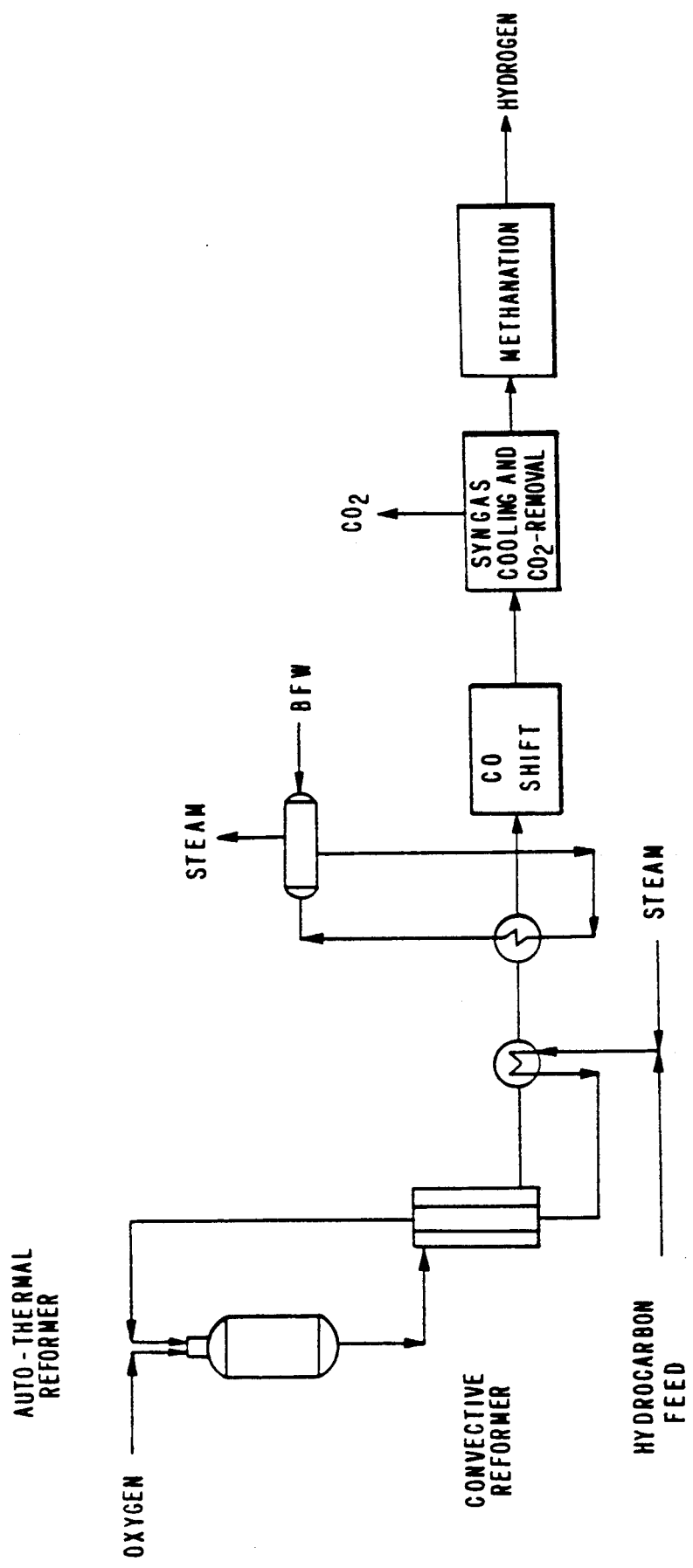
FIG. 5 is a schematic diagram showing how the convective reformer device is used in a process to produce hydrogen and oxo synthesis gases.
Figure 6:
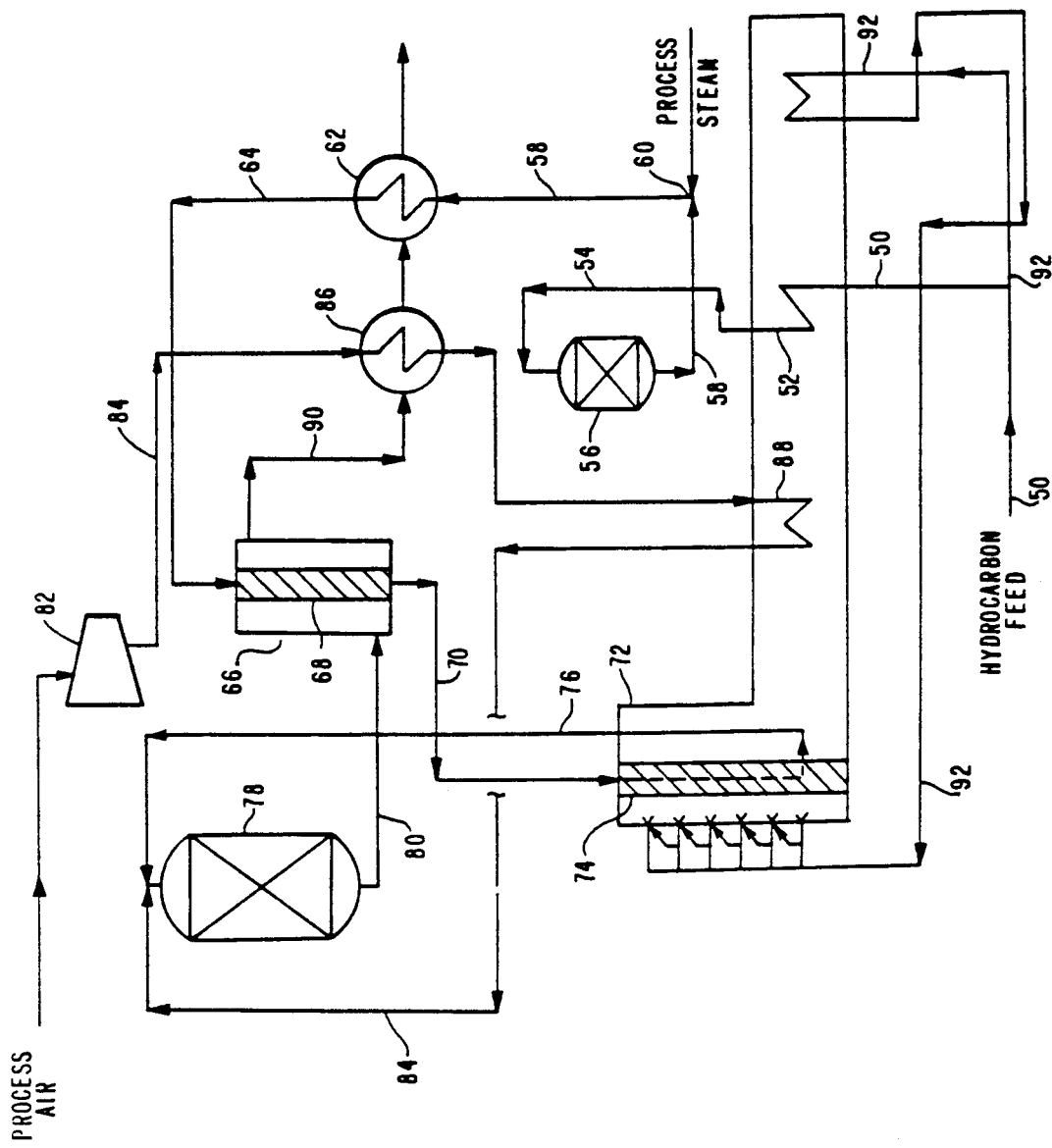
FIG. 6 is a more detailed schematic diagram of a process according to the invention, using a convective reformer device as shown in FIG. 1 in the production of a hydrogen-rich synthesis gas which, in turn, may be used in the production of ammonia as illustrated in FIG. 2.

The convective reformer device of this invention is intended to be operated as the first in a series of two or more reforming stages. The second stage may be a reforming furnace followed by still another, or third, stage such as an auto-thermal reformer, as shown in FIGS. 2 and 6. The second stage can alternatively be a powerformer device, which is in essence another convective reformer but of a different internal design, as shown in FIG. 3. The second stage may also be an auto-thermal reformer, as illustrated in FIGS. 4 and 5. Air, enriched air, or molecular oxygen are used to adiabatically burn a portion of the effluent gases from the convective reformer device and/or the reforming furnaces and to supply heat for reforming the remainder of the unreacted methane in the feed streams in these illustrated systems.

Referring to FIG. 6, a hydrocarbon feed, which may be natural gas, LPG or naphtha, is introduced to the system in conduit 50, and is preheated to a temperatures of about 400° C. in preheater 52. The thermal energy for preheater 52 is supplied by the convective section of reforming furnace 72. The gaseous hydrocarbon feed is then passed from preheater 52, through conduit 54, to reactor 56, which is of conventional design, where it it is pretreated in the usual manner to remove undesirable constituents, such as sulphur compounds. The pretreated gaseous effluent flows from reactor 56 through conduit 58, where it is admixed with flowing process steam introduced through valve 60. The resulting mixture of gaseous hydrocarbons and process steam is passed through conduit 58 to preheater 62, where it is heated to a temperature of 968° F. before being introduced through conduit 64 into convective reformer device 66. Preheater 62 is a conventional gas-to-gas heat exchanger.

Convective reformer 66 contains a tubular portion 68, which is filled with a reforming catalyst, such as the catalyst described above. The heat of reaction for the reforming reaction in convective reformer 66 is supplied solely by the gaseous effluent coming from autothermal reformer 78 through conduit 80. The hydrocarbon and steam mixture fed to convective reformer 66 is heated and contacted with reforming catalyst and it undergoes a partial reforming reaction. The partially reformed gas leaves convective reformer 66 at a temperature of about 1150° to about 1250° F., through conduit 70 for introduction into tubular section 74 of reforming furnace 72. Reforming furnace 72 can be of conventional design and operated in the standard manner. The gaseous effluent from furnace 72, which is preferably at a temperature of about 1400° to about 1500° F., most preferably 1460° F., flows through conduit 76 to auto-thermal reformer 78, where it is introduced together with process air.

The process air is fed to the system through compressor 82, then through conduit 84 to preheaters 86 and 88, respectively, before entering auto-thermal reformer 78 to take part in the reaction. The heating of the process air stream in preheaters 86 and 88 is brought about the use of process waste heat, as shown. Preferably, the process air has a temperature of about 1500° F. before its introduction into auto-thermal reformer 78.

The gaseous effluent emitted from auto-thermal reformer 78, which is a fully reformed gas, is preferably kept at a temperature of 1500° to 1870° F. The fully reformed effluent is directed through conduit 80 to convective reformer 66, where it serves as a heat exchange medium to provide the heat of reaction for the reforming reaction taking place there. This fully reformed gaseous effluent enters convective reformer 66 at a temperature of about 1840° F., typically, but it emerges at a lower temperature of about 1360° F. as a result of the heat exchange phenomenon that takes place. The emerging gas is conducted through conduit 90 for further heat recovery using conventional techniques as shown in FIG. 2.

If desired, a portion of hydrocarbon feed stream 50, shown as stream 92, may be directed through the convective section of reformer furnace 72, where it is preheated, and then to the burners of furnace 72 where it serves as fuel gas for the heating of the process gas in tubular section 74.

The gaseous effluent from auto-thermal reformer 78 in FIG. 6 is comprised chiefly of a mixture of nitrogen, hydrogen, carbon monoxide, carbon dioxide and a small amount of methane. As shown in FIG. 2, after the shifting of carbon monoxide to hydrogen and carbon dioxide, the subsequent removal of carbon dioxide and methanation of any carbon oxides, a mixture of nitrogen and hydrogen is then synthesized into ammonia.

In FIG. 3, the process steps are essentially the same as in FIG. 6, but the reforming furnace has been replaced by a powerformer. In this embodiment, the hydrocarbon feed, after being preheated, is partially reformed in a convective reformer, using the effluent from an auto-thermal reformer as the heat source, as shown. The reforming continues in the powerformer, where pressurized flue gas is used as the heat source, as can be seen. The pressurized hot flue gas emerging from the convective reformer is expanded through an expander turbine, which also drives the combustion air compressor for the burner. The final stage of reforming is achieved in the auto-thermal reformer. The processing sequence after the completion of reforming, to produce ammonia synthesis gas, is the same as shown in FIG. 2.

The application of the convective reformer in series with an auto-thermal reformer only is shown in FIGS. 4 and 5. In FIG. 4, the synthesis gas is tailored to produce methanol as the end product. In FIG. 5, after the carbon monoxide (CO) shift and the carbon dioxide ($CO_2$) removal, the effluent may be methanated to produce either hydrogen or, alternatively, ammonia synthesis gas.

In FIGS. 4 and 5, a feed mixture of gaseous hydrocarbon and steam is partially reformed in a convective reformer. Using the hot effluent gases from the auto-thermal reformer as a heat source, a portion of the gaseous effluent from the convective reformer is combustion burned with oxygen in the auto-thermal reformer, to provide the heat of reforming for the remainder of the gas stream. The product of the combustion, that is the carbon dioxide formed, serves to increase the ratio of carbon to hydrogen in the reformed gas such that the gas is richer in carbon and the hydrogen/carbon oxides ratio is nearly stoichiometric for the methanol reaction. In the normal case, when reforming natural gas the synthesis gas which is produced is rich in hydrogen and, consequently, the hydrogen must be purged from the synthesis section unless an external source of carbon dioxide is available. This carbon dioxide is mixed with the hydrogen-rich synthesis gas produced to get the desired stoichiometric carbon oxides to hydrogen ratio. With the present invention, however, the desired ratio is achieved in a more cost-effective and convenient manner.

Referring again to FIG. 5, the synthesis gas from the auto-thermal reformer, which consists of hydrogen, carbon monoxide and carbon dioxide, is shifted to produce hydrogen. After the shifting, removal of the carbon dioxide and methanation, a relatively pure hydrogen gas is obtained. To produce ammonia, the methanation procedure is not required and can be omitted because the carbon oxides can be removed using a liquid nitrogen wash. The nitrogen wash removes the impurities and, concomitantly, supplies the quantity of nitrogen needed for the ammonia synthesis.

In both FIGS. 4 and 5, the effluent from the auto-thermal reformer, which is redirected back to the convective reformer to serve as a heat exchange medium and to heat the incoming gas, is used further, after it emerges from the convective reformer, to preheat fresh feed prior to introduction of the latter into the convective reformer and also to generate steam for the process, as shown.

A benefit provided by the practice of this invention is that the natural gas consumption for the production of ammonia in particular is decreased in the order of 6 MM BTU/MT.

Other variations of the invention are possible. For instance, the convective reformer device can be modified by placing the catalyst on a support within the "shell" portion (the cavity identified as item 32 in FIGS. 1 and 1A), and passing the feed mixture of hydrocarbons and steam (item 36, FIG. 1) through it, while simultaneously conveying the process effluent that serves as the heating fluid (item 34 in FIG. 1) through the tubular portion (items 24, FIG. 1) of the inner core assembly. The flows can be countercurrent as shown in FIGS. 2–6 or co-current as shown in FIG. 1. Still other modifications will occur to those skilled in the art in view of the above description without departing from the scope of the invention defined in the appended claims.

We claim:
1. A system for the steam reforming of hydrocarbons into a hydrogen-rich gas, which comprises in series:
(a) a convective reformer device having indirect heat-exchange means for partially reforming a feed mixture of hydrocarbons and steam;
(b) a steam reforming furnace having a radiant section, reforming tubes in the radiant section, and means for producing radiant heat for the further reforming of the partially reformed effluent from (a);
(c) an auto-thermal reformer for fully reforming the effluent from (b);
(d) conduit means for passing the partially reformed effluent from (a) to (b);
(e) conduit means for passing the effluent from (b) to (c); and
(f) conduit means for passing the fully reformed effluent from (c) to (a), to supply the heat of reaction for the partial reformation of the hydrocarbon-steam feed mixture.

* * * * *